United States Patent

[11] 3,532,101

[72] Inventor Clifford H. Snyder, Jr.
    Coraopolis, Pennsylvania
[21] Appl. No. 670,069
[22] Filed Sept. 25, 1967
[45] Patented Oct. 6, 1970
[73] Assignee SRM Company
    a corporation of Pennsylvania

[54] LOW PRESSURE GAS COUPLING
    3 Claims, 4 Drawing Figs.
[52] U.S. Cl. .................................................. 137/75,
    251/149.7, 285/318
[51] Int. Cl. ....................................................F16k 17/40,
    F16l 29/00
[50] Field of Search...................................... 285/318,321;
    137/75, 356—362; 251/149—149.9;
    287/135 — Digest; 285/(Callaghan, Arold);
    287(Kundrat); 85/(Kundrat)

[56]  References Cited
    UNITED STATES PATENTS
| | | | |
|---|---|---|---|
| 2,086,569 | 7/1937 | Meyer | 251/149.7 |
| 2,181,758 | 11/1939 | Goon | 251/149.6 |
| 3,027,179 | 3/1962 | Wiltse | 285/321 |
| 3,245,423 | 4/1966 | Hansen et al | 137/75X |
| 3,334,860 | 8/1967 | Bolton | 251/149.1 |
| 3,474,810 | 10/1969 | Welsh | 137/75 |

Primary Examiner—William F. O'Dea
Assistant Examiner—Richard Gerard
Attorney—George Raynovich, Jr.

ABSTRACT: A gas coupling designed to connect a gas appliance to a source of gas under low pressure which provides one coupling half having a valve therein and mounted to a wall or other structure to which the source of gas is connected. The outer portion of the housing of the gas coupling is so designed that it fits into a standard electric receptacle box and is mounted flush with the front cover of the receptacle box. A cylindrical valve is provided within the coupling housing and the cylindrical valve is actuated by an unmelted solder ring which, when the plug or nipple of the coupling is inserted into the housing, causes the valve to be moved axially to the open position. In the event of fire or extremely high temperatures, the solder ring melts, permitting the valve to close as a safety feature.

The plug or nipple of the coupling is held within the housing by a deformable ring-like element which is held in the housing and protrudes radially into the cavity of the housing where the plug forms an interference fit therewith. In one embodiment of the invention, the deformable lock means is a small diameter coil spring that is circled around the opening of the housing. This coil spring, together with the shape of the walls of the groove in which it is positioned, permits the force required to insert the nipple or plug into the housing to be substantially less than the axial force required to pull out or remove the plug or nipple from the housing.

INVENTOR.
CLIFFORD H. SNYDER, JR.
BY
HIS ATTORNEY

INVENTOR.
CLIFFORD H. SNYDER, JR.
HIS ATTORNEY 3,532,101

LOW PRESSURE GAS COUPLING

BACKGROUND OF THE INVENTION

In many appliances, either gas or electricity may be utilized as the source of power for appliances. Electricity has an advantage in some applications because of the fact that the appliance can usually be made more portable by the use of an electric source of power since the plug and socket arrangement of the standard electric outlet permits ease of connection and removal of the appliance. In addition to the ease of connection and removal of the appliance, the standard electric plug provides a flush-mounted arrangement which is recessed into the wall of the home or the outside of a building in the case of outdoor appliances.

The gas industry has developed many gas-powered appliances which may be utilized in the home and outside the home and which are handicapped only by the fact that, until now, connection of the gas appliances has been a rather difficult and time-consuming process. Further, gas fittings protrude from the walls of the home or the exterior of the building to create an unsightly and hazardous arrangement which causes bumps and bruises if no appliance is connected into the outlet and a person bumps the outlet.

The American Gas Association has standardized certain gas appliances and certain gas couplings, primarily as a safety feature. These standardized gas appliances and couplings have certain requirements which must be met and which, in some instances, increase the difficulty of design of the couplings. In order to be accepted generally for use in the gas industry, the couplings or appliances, however they are designed, must have an AGA approval to be useful in the gas appliance field.

SUMMARY

The present invention is directed to a novel, efficient gas coupling which provides the mobility for modern gas appliances in order to make them competitive with electric appliances. The gas coupling of the present invention is so designed that it may be flush-mounted with a wall on the interior of a building, or with a wall on the exterior of a building, to provide a receptacle similar to an electrical receptacle. The coupling of the present invention has been designed so that the housing of the coupling will fit into a standard electrical receptacle box and be flush-mounted therewith. At the same time, the interior capacity of the coupling is such that it meets the AGA approved standards for minimum gas flow through a ¾ inch gas line.

The coupling of the present invention has a cylindrical valve located within the housing, which valve is normally closed under a spring force when the coupling is disengaged. The cylindrical valve is so designed that it admits maximum flow through the coupling in order to meet the AGA approved standards of minimum flow through a ¾ inch gas line.

In order to comply with the AGA requirements for a fusible link in a gas coupling to permit closure of a valve in the event of fire or high temperature conditions, the coupling of the present invention has a novel, unmelted solder ring valve actuator which provides the link between the nipple and the valve so that, upon insertion of the nipple into the housing, the valve is opened through a solder ring. The use of the unmelted solder ring substantially reduces the cost of manufacture of the coupling since the solder ring, in the unmelted condition, is merely inserted into the coupling rather than having a soldered, fusible link of another type to actuate the valve.

In addition, the use of a solder ring as a valve actuator provides a novel, full-flow actuator for the cylindrical valve of the present invention. Thus, with the solder ring, the cylindrical valve may be opened upon insertion of the nipple into the housing and, in the event of a high temperature condition, the solder ring, upon melting, permits the valve to close even though the nipple remains in the housing.

The nipple of the coupling of the present invention may be inserted into the housing simply by pushing the nipple into the housing. Likewise, the nipple may be withdrawn from the housing simply by pulling the nipple out of the housing. The coupling of the present invention has been designed so that a predetermined axial force is required to pull the nipple out of the housing. Since the gas utilized in domestic appliance use is of relatively low pressure, there is no requirement for positively locking the nipple into the housing other than that the nipple remain in the housing under a force less than a certain predetermined force required to withdraw the nipple from the housing.

In one embodiment of the present invention, a lock arrangement has been provided to hold the nipple into the housing which permits the nipple to be inserted with much less force than is required to remove the nipple from the housing. In this embodiment, the nipple being inserted is axially working against the force of the valve spring urging the valve of the housing to the closed position. Nevertheless, the nipple, working against the force of the valve spring, may be inserted with less force than is required to remove the nipple from the housing. This arrangement is possible because of the use of a helical coil spring as the lock means to retain the nipple in the housing and an angled wall groove to retain the spring which permits the spring to expand more readily when the nipple is being inserted than it is able to do when the nipple is being withdrawn.

With the foregoing considerations in mind, it is an object of the present invention to provide an improved gas-tight coupling.

Another object of the present invention is to provide a gas coupling in which the housing may be flush-mounted within a standard electrical receptacle box.

Another object of the present invention is to provide a gas coupling in which the nipple may be inserted into the housing by simply pushing the nipple into the housing and in which the nipple may be withdrawn from the housing by simply pulling the nipple from the housing.

Another object of the present invention is to provide a gas coupling in which an unmelted solder ring is utilized to actuate the valve within the coupling.

Another object of the present invention is to provide a valved gas coupling in which the force required to insert the nipple into the housing is substantially less than the force required to withdraw the nipple from the housing.

Another object of the present invention is to provide a gas coupling which will fit into a standard electrical receptacle box and through which a minimum acceptable flow for an AGA approved ¾ inch coupling can be obtained.

These and other objects of the present invention will become apparent as this description proceeds in conjunction with the accompanying drawings.

DESCRIPTION OF THE EMBODIMENT OF FIGS. 1 AND 2

Figure 1:
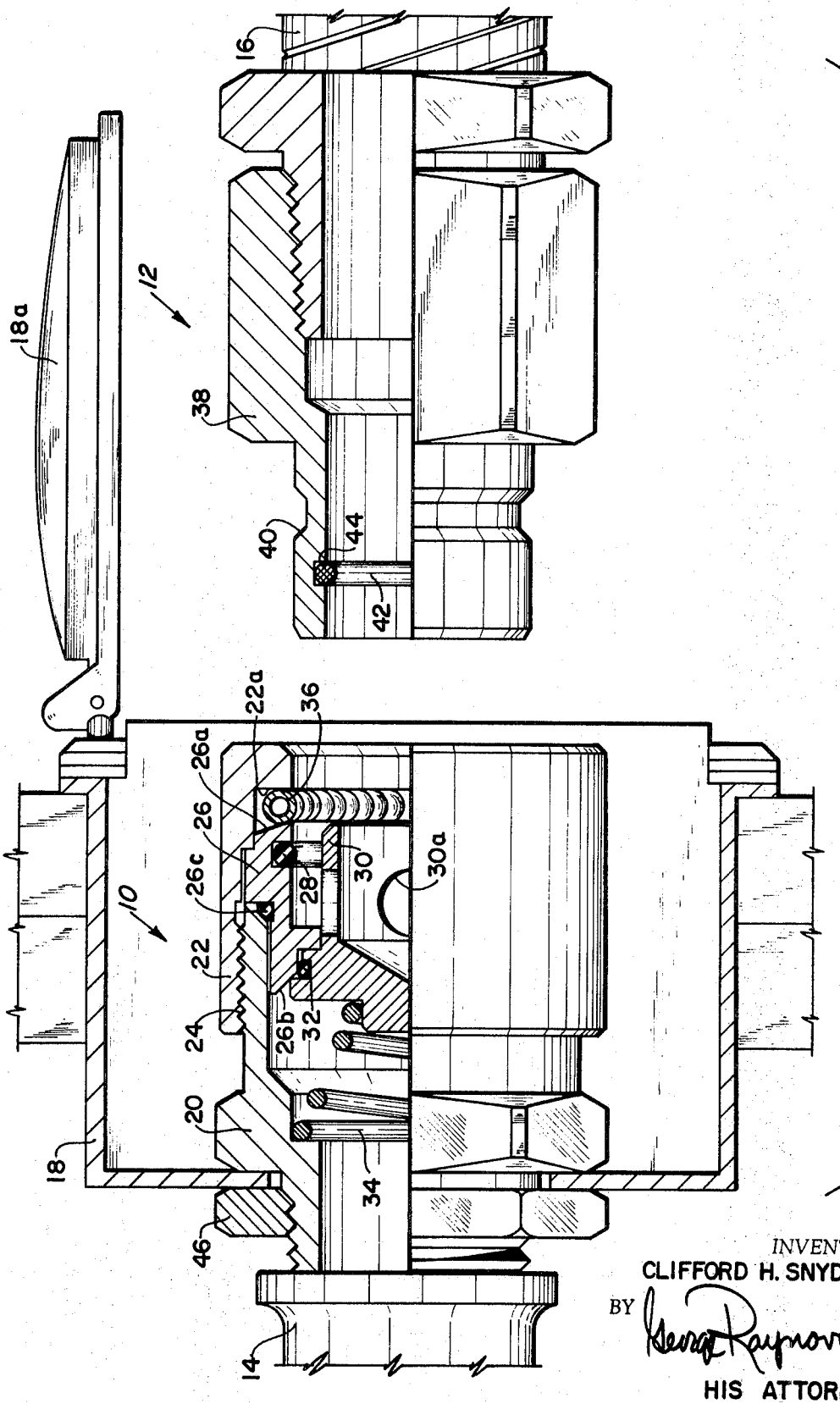
FIG. 1 is a partial sectional view of one embodiment of the coupling of the present invention in the disengaged position.
Figure 2:
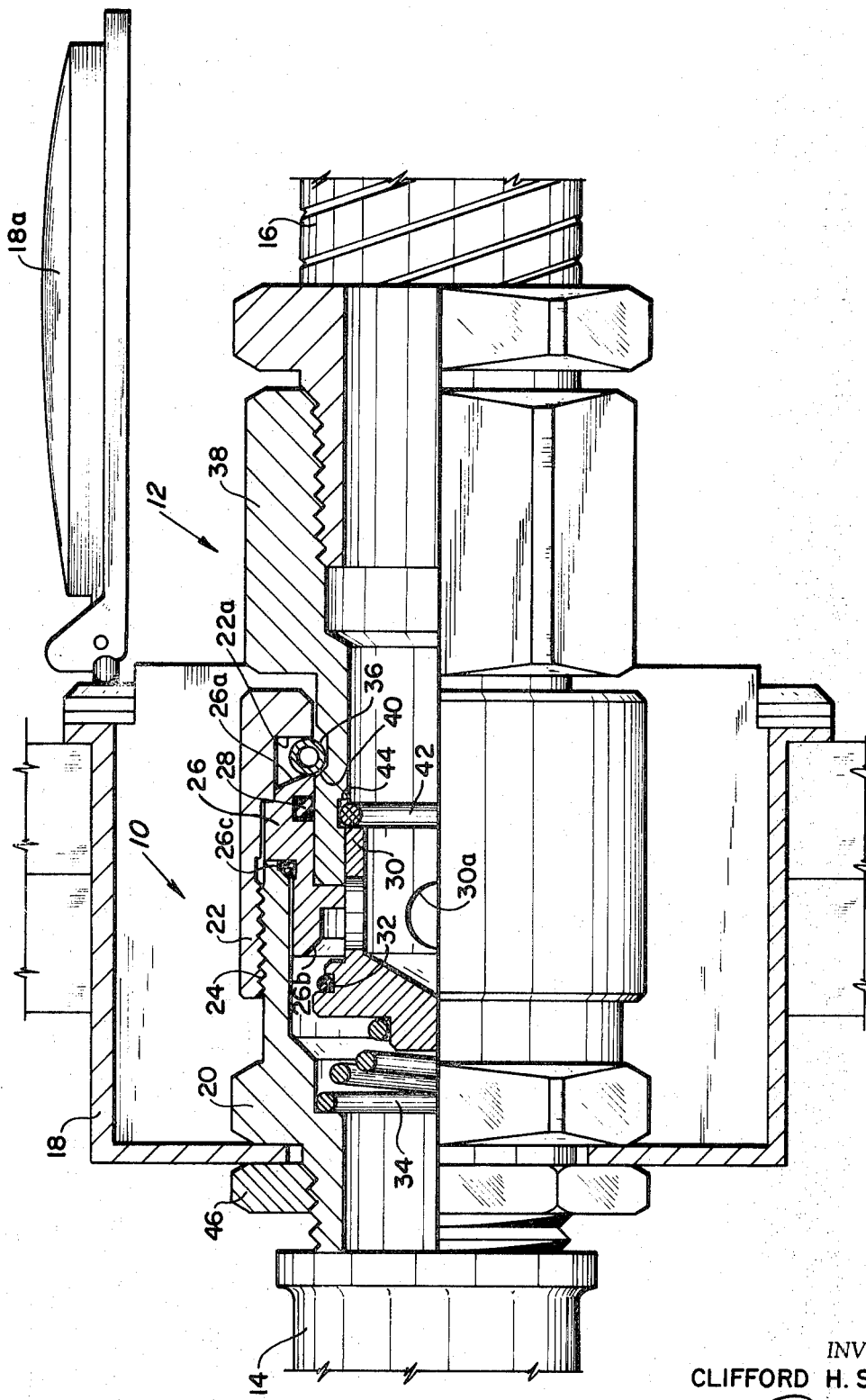
FIG. 2 is a partial sectional view of the coupling of FIG. 1 in the engaged position.

Referring to the drawings, and particularly to FIGS. 1 and 2, there is shown a coupling having a housing 10 and a nipple 12. The housing 10 is connected to a gas source conduit 14 which brings gas from a gas source to an appliance. An appliance conduit 16 is attached to the nipple 12.

The housing 10 of the gas coupling is positioned within a standard electrical receptacle box 18 having a cover 18a. The electrical receptacle box is the type which receives a standard wall plug for installation in the home and is preferably of the type which receives an outdoor wall plug that has the cover 18a to protect the receptacle from the weather.

The housing 10 of the coupling has a housing body 20 onto which is threaded a housing collar 22 by means of threads 24. The housing collar 22 has an inwardly extending annular surface 22a for a purpose to be described.

When housing collar 22 is threaded onto the housing body 20, a valve guide 26 is clamped axially therebetween. The valve guide 26 is generally cylindrical in shape and has a frusto-conical surface 26a formed on the end thereof.

The generally cylindrical valve guide 26 also has a conical valve seat 26b formed at the end opposite to frusto-conical surface 26a. An O-ring 26c is positioned between the housing body 20 and the valve guide 26 to seal the valve guide to housing body 20. Formed on the cylindrical internal surface of valve guide 26 is a groove which receives an O-ring 28 that seals against the nipple 12 when the nipple 12 is inserted into the housing in a manner to be described.

Slidingly disposed within the valve guide 26 is a cylindrical valve 30 having fluid passages 30a formed therein. The valve 30 has an O-ring seal 32 positioned in a conical surface thereof so that O-ring seal 32 contacts valve guide 26 when the valve 30 is seated against the conical valve seat 26b as shown in FIG. 1. The valve 30 is urged to the seated position as shown in FIG. 1 by a helical spring 34 disposed between the valve 30 and the housing body 20.

The annular surface 22a of housing collar 22 and the frusto-conical surface 26a of valve guide 26 form the two side walls of a recess within the cylindrical internal surface of the coupling housing 10. Into this recess is positioned a lock spring 36. The lock spring 36 is a small diameter helical spring which is laid into the recess so that a portion of it protrudes radially into the cavity formed within the housing 10. The frusto-conical surface 26a is formed so that an element of a cone is positioned at approximately 60° to the axis of the cone of which surface 26a is a section.

The nipple 12 of the coupling has a nipple body 38 within which is formed a lock recess 40. Lock recess 40 is annular and formed in the cylindrical external surface of the nipple body.

Into a groove formed in the cylindrical internal surface of nipple body 38 is positioned an unmelted solder ring 42 which extends radially into the cylindrical space defined by the internal wall of the nipple body 38. The annular groove 44 retains the unmelted solder ring 42 and prevents axial movement of the solder ring.

In order to maintain the housing 10 within the receptacle box 18, a nut 46 is threaded over a threaded portion of housing body 20 to hold the housing 10 rigidly within the electrical receptacle box 18.

When the coupling of the present invention is in the disengaged position shown in FIG. 1, the helical spring 34 causes the valve 30 to seat against the valve seat 26b thereby sealing the housing and preventing flow of gas therethrough.

When the coupling is engaged as shown in FIG. 2, the nipple 12 is inserted into the housing. A solder ring 42 projecting into the nipple area contacts the end of cylindrical valve 30 and causes cylindrical valve 30 to move, against the force of spring 34, away from valve seat 26b. The outer surface of nipple body 38 causes the lock spring 36 to deform radially and to ride up the frusto-conical surface 26a so that the nipple may be inserted into the housing 20. When the nipple 12 is fully inserted into the housing 10, the lock recess 40 on nipple 12 is axially aligned with the lock spring 36 and lock spring 36 returns to its original shape and enters into recess 40. This locks the nipple 12 into the housing 10. At the same time, the solder ring 42 is holding the valve 30 in the open position as shown in FIG. 2.

It will be seen that when the valve is opened by solder ring 42, solder ring 42 is the only thing that is holding the valve 30 in the open position. If a fire or other high temperature condition should result, the solder ring 42 would melt thereby permitting the valve 30 to be closed by spring 34 even though the nipple 12 were still locked in the housing 10.

To retract the nipple 12 from housing 10, it is merely necessary to exert a force in excess of a predetermined axial force upon the nipple 12 and pull it from the housing 10. When this is done, the lock spring 36 deforms radially outwardly and permits the nipple to be withdrawn from the housing 10.

Because the frusto-conical surface 26a permits the lock spring 36 to more readily ride up thereon than does the annular surface 22a of housing collar 22, the nipple 12 requires much less force to insert it into the housing 10 than it requires to withdraw it from the housing 10. This is a desired feature in that the gas appliance may be easily plugged into the wall but may not be accidentally disconnected therefrom unless sufficient force is exerted to pull the nipple 12 from the housing 10.

It has been found that the positioning of the frusto-conical surface 26a so that the elements of the cone form an angle of approximately 60° with the axis permits an optimum arrangement for the gas coupling. Further, the force and resiliency exerted by lock spring 36 determines the absolute force that is required to insert the nipple 12 into the housing 10 and to withdraw the nipple 12 from the housing 10. With the arrangement shown in FIG. 1, substantially less force is required to insert the nipple 12 into the housing 10 even though, upon insertion, the nipple 12 is being forced against the force of spring 34.

The provision of the cylindrical valve 30 permits a large flow rate through the coupling housing 10 so that the coupling housing externally is relatively small in that it may fit into a standard electrical receptacle box, while internally it accommodates the flow rate required for a ¾ inch AGA approved gas coupling.

DESCRIPTION OF THE EMBODIMENT OF FIGS. 3 AND 4

Figure 3:
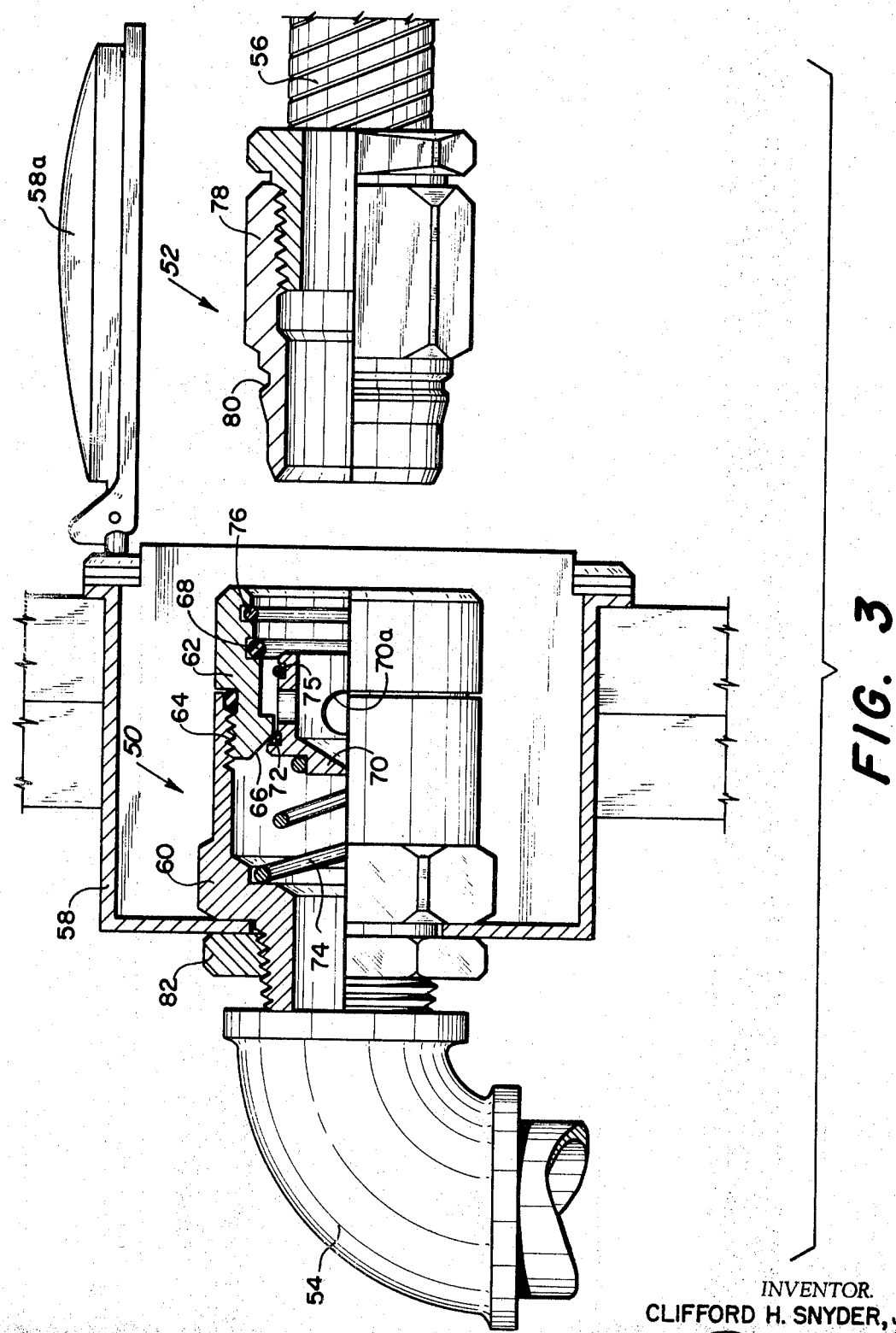
FIG. 3 is a partial sectional view of a second embodiment of the coupling of the present invention in the disengaged position.
Figure 4:
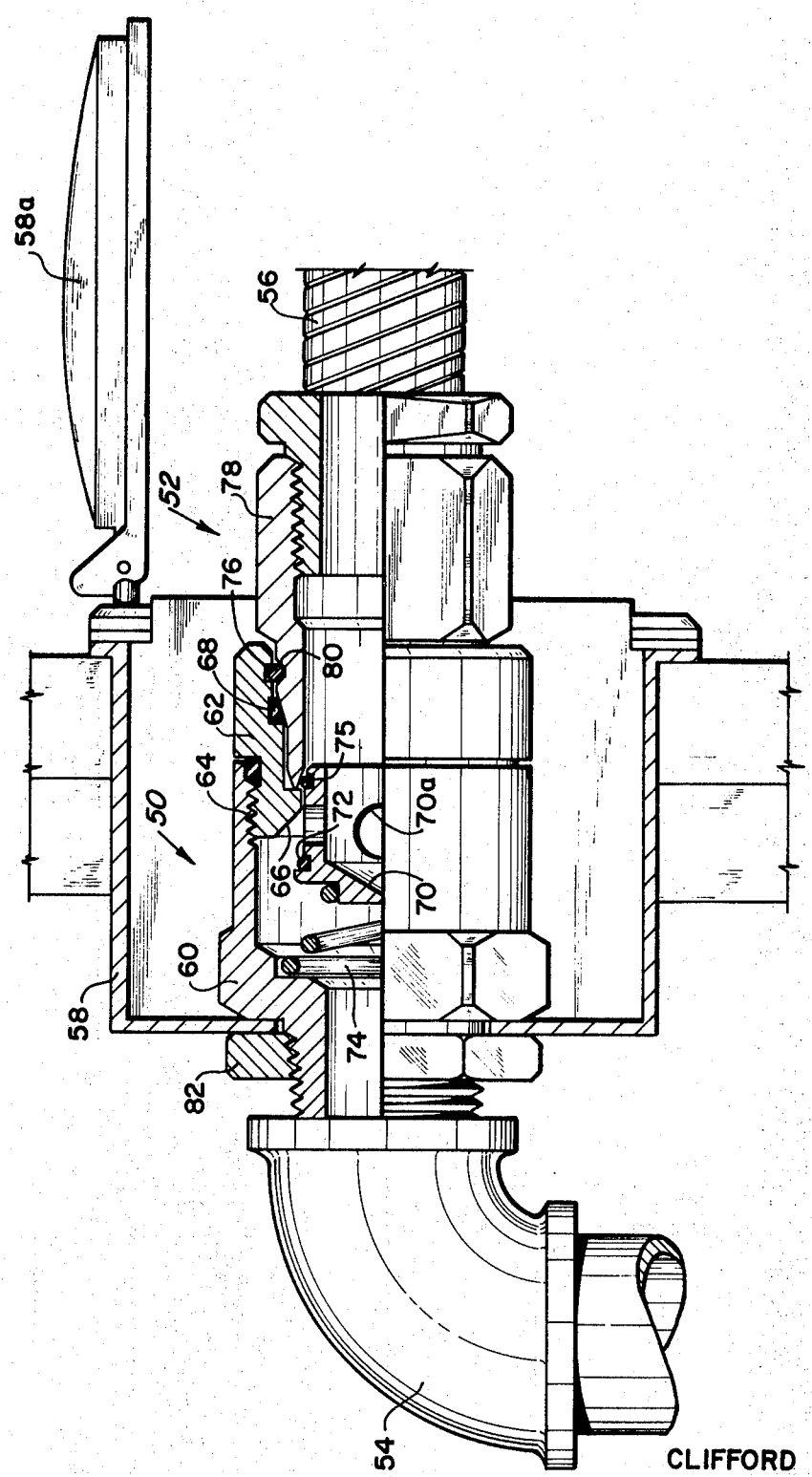
FIG. 4 is a partial sectional view of the coupling of FIG. 3 in the engaged position.

Referring to the drawings, and particularly to FIGS. 3 and 4, there is shown a second coupling having a housing 50 and a nipple 52. A gas source conduit 54 is fixed to housing 50 and an appliance conduit 56 is connected to nipple 52. The housing 50 of the coupling is positioned within an electrical receptacle box 58 having a cover 58a.

The housing 50 has a housing body 60 with a housing collar and valve guide 62 threaded into it. The threads 64 permit the collar and valve guide 62 to be attached to the housing body 60.

The collar and valve guide 62 has a conical valve seat 66 formed thereon. An O-ring 68 is positioned within a groove formed in the cylindrical internal surface of collar and valve guide 62 to seal against the nipple 52 when the nipple is inserted into the housing.

The cylindrical valve 70 having fluid passages 70a formed therein is slidingly received within the housing collar and valve guide 62. An O-ring 72 is positioned on cylindrical valve 70 so that it abuts valve seat 66 when the valve is in the closed position shown in FIG. 3. A helical spring 74 disposed between the housing body 60 and the valve 70 urges the valve to the closed position as shown in FIG. 3. The valve 70 has an unmelted solder ring 75 positioned within a groove in the cylindrical external surface of valve 70 to serve as a valve actuator. Positioned within a groove formed on the cylindrical internal surface of housing collar and valve guide 62 is a lock ring 76 preferably formed of polyflurotetraethylene, commonly sold under the trade name "Teflon". The lock ring 76 protrudes into the cylindrical area defined by the internal surface of collar and valve guide 62 but is deformable radially outwardly to lock the nipple within the housing.

The nipple 52 is formed with a nipple body 78 having an annular lock recess 80 formed on the cylindrical external surface thereof. The lock recess is designed to receive the lock ring 76 when the nipple 52 is inserted into the coupling housing 50.

The housing 50 is retained within the electrical receptacle box 58 by a nut 82 threaded onto the housing body 60.

When the coupling of FIGS. 3 and 4 is in the disengaged position shown in FIG. 3, the valve 70 is seated against the conical valve seat 66 under the force of helical spring 74.

When the nipple 52 is inserted into the housing 60, the end of nipple 52 contacts the solder ring 75 positioned on the valve 70. As the nipple 52 is inserted into the housing 50, the valve 70 is forced axially away from its seat. The nipple 52 is inserted until the lock recess 80 is axially aligned with lock ring 76 at which time the lock ring 76 returns from a deformed condition to its original shape and locks the nipple within the housing 50. It will be seen that while the coupling is in the engaged position shown in FIG. 4, the only thing holding the valve 70 in the open position is the solder ring 75. In the event of a high temperature condition, the solder ring 75 melts, thereby permitting the valve 70 to close even though the nipple 52 remains locked within the housing 50.

To withdraw the nipple 52 from the housing 50 requires only an axial force pulling the nipple 52 out of the housing 50.

Because the solder ring 75 is unmelted, it is easily assembled into the coupling and eases manufacture of the coupling.

According to the provisions of the patent statutes, I have explained the principle, preferred construction, and mode of operation of my invention, and have illustrated and described what I now consider to represent its best embodiments. However, I desire to have it understood that, within the scope of the appended claims, the invention may be practiced otherwise than as specifically illustrated and described.

I claim:

1. A coupling for removably connecting an appliance conduit to a low pressure gas source conduit comprising:
   a. a housing fixed to said gas source conduit, said housing adapted to receive a nipple;
   b. a nipple fixed to said appliance conduit and being adapted to be received within said housing, said nipple having an annular lock recess formed on the external surface thereof;
   c. deformable lock means disposed within said housing and cooperating with said nipple annular lock recess when said nipple is inserted into said housing to thereby axially lock said nipple within said housing against any axial separating force less than a predetermined axial separating force but permitting said nipple to separate from said housing when said predetermined axial separating force is exceeded, said deformable lock means being formed from a small diameter helical spring positioned within an annular recess formed within the cylindrical internal surface of said housing, said recess having the wall nearer the nipple insertion end of said housing formed in a plane normal to the axis of said housing and having the wall of said recess farther from the nipple insertion end of said housing formed of a frusto-conical surface with the apex of the cone pointing toward the nipple insertion end of said housing;
   d. a cylindrical valve positioned within said housing and spring loaded to normally close said housing to the passage of fluid therethrough when said nipple is withdrawn from said housing; and
   e. an unmelted fusible ring utilized as a structural member and positioned within said coupling to transmit an axial force from said nipple to said cylindrical valve to actuate said cylindrical valve to open said valve when said nipple is locked into said coupling and to permit said valve to close in the event of heat sufficient to melt said fusible ring even though said nipple remains axially locked within said coupling.

2. The coupling of claim 1 wherein said solder ring is positioned on said nipple and contacts said cylindrical valve to move said valve to the open position when said nipple is locked into said housing.

3. A coupling for removably connecting an appliance conduit to a fluid source conduit comprising:
   a. a housing fixed to said fluid source conduit, said housing adaptive to receive a nipple;
   b. a nipple fixed to said appliance conduit and being adapted to be received within said housing, said nipple having an annular lock recess formed on the external surface thereof;
   c. deformable lock means disposed within said housing and cooperating with said nipple annular lock recess when said nipple is inserted into said housing to thereby axially lock said nipple within said housing against any axial separating force less than a predetermined axial separating force but permitting said nipple to separate from said housing when said predetermined axial separating force is exceeded, said deformable lock means being formed from a small diameter helical spring positioned within an annular recess formed within the cylindrical internal surface of said housing, said recess having the wall nearer the nipple insertion end of said housing formed in a plane normal to the axis of said housing and having the wall of said recess farther from the nipple insertion end of said housing formed of a frusto-conical surface with the apex of the cone pointing toward the nipple insertion end of said housing;
   d. a valve positioned within said housing and spring loaded to normally close said housing to the passage of fluid therethrough when said nipple is withdrawn from said housing; and
   e. a valve actuator positioned within said coupling to transmit an axial force from said nipple to said valve to actuate said valve to open said valve when said nipple is locked into said coupling.